US008546277B2

(12) United States Patent
Plantamura

(10) Patent No.: US 8,546,277 B2
(45) Date of Patent: Oct. 1, 2013

(54) HEATING PLASTICS VIA INFRARED RADIATION

(75) Inventor: Bernard Plantamura, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 576 days.

(21) Appl. No.: 12/526,861

(22) PCT Filed: Feb. 7, 2008

(86) PCT No.: PCT/FR2008/000145
§ 371 (c)(1),
(2), (4) Date: Dec. 29, 2009

(87) PCT Pub. No.: WO2008/113908
PCT Pub. Date: Sep. 25, 2008

(65) Prior Publication Data
US 2010/0089906 A1    Apr. 15, 2010

(30) Foreign Application Priority Data
Mar. 2, 2007    (FR) ..................... 07 01533

(51) Int. Cl.
H01L 21/00    (2006.01)
H05B 3/18    (2006.01)

(52) U.S. Cl.
USPC .......................................... 438/795; 219/553

(58) Field of Classification Search
USPC ....... 219/121.12, 121.61, 411, 553; 438/795; 425/174, 445
See application file for complete search history.

(56) References Cited

U.S. PATENT DOCUMENTS

| | | | |
|---|---|---|---|
| 2,769,117 A | 10/1956 | Pirillo | |
| 3,309,553 A | 3/1967 | Kroemer | |
| 3,626,143 A | 12/1971 | Fry | |
| 3,627,989 A * | 12/1971 | Heidler et al. | 219/553 |
| 3,640,671 A | 2/1972 | Reilly | |
| 3,768,314 A | 10/1973 | Metzler et al. | |
| 3,950,459 A | 4/1976 | Seefluth | |
| 3,957,618 A | 5/1976 | Spirig | |
| 3,974,016 A | 8/1976 | Bondybey et al. | |
| 3,975,618 A | 8/1976 | Goos et al. | |
| 4,020,232 A | 4/1977 | Kohmura et al. | |
| 4,050,887 A | 9/1977 | Berggren et al. | |
| 4,058,699 A | 11/1977 | van Vloten | |
| 4,079,104 A | 3/1978 | Dickson et al. | |
| 4,097,715 A | 6/1978 | Frizzi | |
| 4,135,077 A | 1/1979 | Wills | |
| 4,147,487 A | 4/1979 | Dickson et al. | |
| 4,163,238 A | 7/1979 | Esaki et al. | |
| 4,204,111 A | 5/1980 | Yonko | |
| 4,224,096 A * | 9/1980 | Osborne | 156/380.9 |
| 4,234,297 A | 11/1980 | Kontz | |
| 4,304,978 A | 12/1981 | Saunders | |
| 4,313,720 A | 2/1982 | Spurr | |
| 4,331,858 A | 5/1982 | Wagner | |
| 4,338,114 A | 7/1982 | Brockway et al. | |
| 4,374,678 A | 2/1983 | Castro | |
| 4,409,455 A | 10/1983 | Belcher et al. | |
| 4,456,811 A | 6/1984 | Hella et al. | |
| 4,459,458 A | 7/1984 | Vetsch et al. | |
| 4,481,405 A | 11/1984 | Malick | |
| 4,486,639 A | 12/1984 | Mittelsteadt | |
| 4,507,538 A | 3/1985 | Brown et al. | |
| 4,606,723 A | 8/1986 | Pasternicki | |
| 4,617,439 A | 10/1986 | Lespinats et al. | |
| 4,665,298 A | 5/1987 | La Rocca | |
| 4,672,169 A | 6/1987 | Chambers | |
| 4,692,583 A | 9/1987 | Kimura et al. | |
| 4,720,480 A | 1/1988 | Ito et al. | |
| 4,754,141 A | 6/1988 | Mindock | |
| 4,810,092 A | 3/1989 | Auth | |
| 4,816,694 A | 3/1989 | Kuppenheimer, Jr. et al. | |
| 4,820,682 A | 4/1989 | Shimomura et al. | |
| 4,820,686 A | 4/1989 | Ito et al. | |
| 4,840,933 A | 6/1989 | Usami et al. | |
| 4,856,978 A | 8/1989 | Voss et al. | |
| 4,857,501 A | 8/1989 | Usami et al. | |
| 4,894,509 A | 1/1990 | Chalco et al. | |
| 4,900,891 A | 2/1990 | Vega et al. | |
| 4,923,847 A | 5/1990 | Ito et al. | |
| 4,924,957 A | 5/1990 | Gigla | |
| 4,929,411 A | 5/1990 | Usami et al. | |

(Continued)

FOREIGN PATENT DOCUMENTS

AU    2005-311723 A1    6/2006
CA    2 449 508 A1    11/2002

(Continued)

OTHER PUBLICATIONS

Alaiti, S., et al. "Tacrolimus (FK506) ointment for atopic dermatitis: A phase I study in adults and children," Journal of the American Academy of Dermatology, 38 (1), Jan. 1998, pp. 69-76.

"Combination Therapies Offer New Management Options for Acne and Rosacea," American Academy of Dermatology—Public Resources, Press Release, Oct. 17, 2001, New York, NY.

"Diode Array for Wheel Alignment," CorkOpt Ltd., Date not available.

Feldman, S.R., et al. "Destructive Procedures are the Standard of Care for Treatment of Actinic Keratoses," Journal of the American Academy of Dermatology, 40 (1), Jan. 1999, pp. 43-47.

(Continued)

Primary Examiner — Calvin Lee
(74) Attorney, Agent, or Firm — Sughrue Mion, PLLC

(57) ABSTRACT

Process for heating a plastic by means of at least one source of electromagnetic radiation, characterized in that the electromagnetic radiation is emitted in the infrared at a wavelength or in a wavelength spectrum contained in one of the following ranges:

1110-1160 nm;
1390-1450 nm;
1610-1650 nm;
1675-1700 nm;
1880-2100 nm;
2170-2230 nm.

15 Claims, No Drawings

(56) References Cited

U.S. PATENT DOCUMENTS

| | | |
|---|---|---|
| 4,948,937 A | 8/1990 | Blank et al. |
| 4,989,791 A | 2/1991 | Ridenour |
| 4,999,333 A | 3/1991 | Usami et al. |
| 5,010,231 A | 4/1991 | Huizinga |
| 5,010,659 A | 4/1991 | Treleven |
| 5,028,580 A | 7/1991 | Shimomura et al. |
| 5,066,222 A | 11/1991 | Roos et al. |
| 5,068,512 A | 11/1991 | Van Geel et al. |
| 5,110,209 A | 5/1992 | Elshoud et al. |
| 5,130,292 A | 7/1992 | Ito et al. |
| 5,146,239 A | 9/1992 | Ono |
| 5,160,556 A | 11/1992 | Hyde et al. |
| 5,163,179 A | 11/1992 | Pellegrini |
| 5,178,990 A | 1/1993 | Satake et al. |
| 5,206,039 A | 4/1993 | Valyi |
| 5,208,434 A | 5/1993 | Minamida et al. |
| 5,246,910 A | 9/1993 | Koshizuka et al. |
| 5,256,341 A | 10/1993 | Denis et al. |
| 5,260,258 A | 11/1993 | Ito et al. |
| 5,260,715 A | 11/1993 | Kishimi |
| 5,261,415 A | 11/1993 | Dussault |
| 5,270,285 A | 12/1993 | Ito et al. |
| 5,308,233 A | 5/1994 | Denis et al. |
| 5,318,362 A | 6/1994 | Schietinger et al. |
| 5,322,651 A | 6/1994 | Emmer |
| 5,349,211 A | 9/1994 | Kato |
| 5,352,652 A | 10/1994 | Ito et al. |
| 5,382,441 A | 1/1995 | Lentz et al. |
| 5,394,492 A | 2/1995 | Hwang |
| 5,408,488 A | 4/1995 | Kurihara et al. |
| 5,439,872 A | 8/1995 | Ito et al. |
| 5,457,299 A | 10/1995 | Blais et al. |
| 5,501,759 A | 3/1996 | Forman |
| 5,509,733 A | 4/1996 | Danley |
| 5,509,796 A | 4/1996 | Di Settembrini |
| 5,565,119 A | 10/1996 | Behun et al. |
| 5,589,210 A | 12/1996 | De La Luz Martinez et al. |
| 5,589,715 A | 12/1996 | Nishitani et al. |
| 5,618,489 A | 4/1997 | Weissmann |
| 5,658,667 A | 8/1997 | Yoshida et al. |
| 5,681,521 A | 10/1997 | Emmer et al. |
| 5,698,866 A | 12/1997 | Doiron et al. |
| 5,714,249 A | 2/1998 | Yoshida et al. |
| 5,740,314 A | 4/1998 | Grimm |
| 5,741,583 A | 4/1998 | Yoshida |
| 5,759,200 A | 6/1998 | Azar |
| 5,773,149 A | 6/1998 | Yoshida et al. |
| 5,780,524 A | 7/1998 | Olsen |
| 5,820,820 A | 10/1998 | Pierce |
| 5,834,313 A | 11/1998 | Lin |
| 5,865,546 A | 2/1999 | Ganthier et al. |
| 5,880,710 A | 3/1999 | Jaberi et al. |
| 5,882,797 A | 3/1999 | Yoshida et al. |
| 5,883,362 A | 3/1999 | Pettibone et al. |
| 5,886,313 A | 3/1999 | Krause et al. |
| 5,888,644 A | 3/1999 | Yoshida et al. |
| 5,920,677 A | 7/1999 | Emmer et al. |
| 5,925,710 A | 7/1999 | Wu et al. |
| 5,935,709 A | 8/1999 | Yoshida |
| 5,953,356 A | 9/1999 | Botez et al. |
| 5,975,935 A | 11/1999 | Yamaguchi et al. |
| 5,976,288 A * | 11/1999 | Ekendahl ................ 156/78 |
| 5,976,450 A | 11/1999 | Mreijen |
| 5,980,229 A | 11/1999 | Collombin |
| 5,985,203 A | 11/1999 | Bowkett |
| RE36,561 E | 2/2000 | Saito et al. |
| 6,022,920 A | 2/2000 | Maxwell et al. |
| 6,038,786 A | 3/2000 | Aisenberg et al. |
| 6,069,345 A | 5/2000 | Westerberg |
| 6,080,146 A | 6/2000 | Altshuler |
| 6,080,353 A | 6/2000 | Tsuchiya |
| 6,104,604 A | 8/2000 | Anderson et al. |
| 6,113,837 A | 9/2000 | Erickson |
| 6,113,840 A | 9/2000 | Emmer et al. |
| 6,146,677 A | 11/2000 | Moreth |
| 6,174,388 B1 | 1/2001 | Sikka et al. |
| 6,174,404 B1 | 1/2001 | Klinger |
| 6,193,931 B1 | 2/2001 | Lin et al. |
| 6,246,935 B1 | 6/2001 | Buckley |
| 6,294,769 B1 | 9/2001 | McCarter |
| 6,357,504 B1 | 3/2002 | Patel et al. |
| 6,361,301 B1 | 3/2002 | Scaglotti |
| 6,372,318 B1 | 4/2002 | Collette et al. |
| 6,387,089 B1 | 5/2002 | Kreindel et al. |
| 6,417,481 B2 | 7/2002 | Chen et al. |
| 6,437,292 B1 | 8/2002 | Sikka et al. |
| 6,441,510 B1 | 8/2002 | Hein et al. |
| 6,444,946 B1 | 9/2002 | Korte |
| 6,450,941 B1 | 9/2002 | Larson |
| 6,451,152 B1 | 9/2002 | Holmes et al. |
| 6,461,929 B1 | 10/2002 | Löbl et al. |
| 6,476,345 B1 | 11/2002 | Sator |
| 6,482,672 B1 | 11/2002 | Hoffman et al. |
| 6,503,586 B1 | 1/2003 | Wu et al. |
| 6,507,042 B1 | 1/2003 | Mukai et al. |
| 6,560,893 B1 | 5/2003 | Bakalar |
| 6,573,527 B1 | 6/2003 | Sugiyama et al. |
| 6,617,539 B1 | 9/2003 | Koinuma et al. |
| 6,621,039 B2 | 9/2003 | Wang et al. |
| 6,632,087 B1 | 10/2003 | Armellin et al. |
| 6,638,413 B1 | 10/2003 | Weinberg et al. |
| 6,667,111 B2 | 12/2003 | Sikka et al. |
| 6,670,570 B2 | 12/2003 | Giacobbe et al. |
| 6,710,281 B1 | 3/2004 | Wachnuk |
| 6,756,697 B2 | 6/2004 | Mizutani et al. |
| 6,815,206 B2 | 11/2004 | Lin et al. |
| 6,845,635 B2 | 1/2005 | Watanabe |
| 6,857,368 B2 | 2/2005 | Pitz |
| 6,892,927 B2 | 5/2005 | Rumer et al. |
| 6,905,326 B2 | 6/2005 | Voth et al. |
| 6,949,217 B2 * | 9/2005 | Silverbrook ................ 264/446 |
| 6,991,704 B2 * | 1/2006 | Broadbent ................ 159/6.1 |
| 7,009,140 B2 | 3/2006 | Partio et al. |
| 7,015,422 B2 | 3/2006 | Timans |
| 7,060,942 B2 | 6/2006 | Friedl et al. |
| 7,063,820 B2 | 6/2006 | Goswami |
| 7,155,876 B2 | 1/2007 | VanderTuin et al. |
| 7,220,378 B2 | 5/2007 | Cochran et al. |
| 7,291,811 B2 | 11/2007 | Evrard et al. |
| 7,307,243 B2 | 12/2007 | Farkas et al. |
| 7,425,296 B2 | 9/2008 | Cochran et al. |
| 8,303,290 B2 | 11/2012 | Feuilloley et al. |
| 2001/0019045 A1 | 9/2001 | Chen et al. |
| 2002/0030307 A1 | 3/2002 | Deemer et al. |
| 2002/0056707 A1 | 5/2002 | Pinho et al. |
| 2002/0062161 A1 | 5/2002 | Dusterhoft |
| 2002/0125234 A1 | 9/2002 | Chen et al. |
| 2003/0118686 A1 | 6/2003 | Voth et al. |
| 2004/0010298 A1 | 1/2004 | Altshuler et al. |
| 2004/0056006 A1 | 3/2004 | Jones et al. |
| 2004/0161486 A1 | 8/2004 | Pickel |
| 2004/0231301 A1 | 11/2004 | VanderTuin et al. |
| 2005/0146065 A1 | 7/2005 | Cochran et al. |
| 2005/0161866 A1 | 7/2005 | Batlaw |
| 2005/0193690 A1 | 9/2005 | Schoeneck |
| 2006/0011604 A1 | 1/2006 | Avrard et al. |
| 2006/0011898 A1 | 1/2006 | Melzig et al. |
| 2006/0019846 A1 | 1/2006 | Fan et al. |
| 2006/0048881 A1 | 3/2006 | Evans et al. |
| 2006/0056673 A1 | 3/2006 | Dehmeshki |
| 2006/0097417 A1 | 5/2006 | Emmer |
| 2006/0118983 A1 | 6/2006 | Cochran et al. |
| 2006/0232674 A1 | 10/2006 | Cochran |
| 2006/0280825 A1 | 12/2006 | Cochran et al. |
| 2007/0009635 A1 | 1/2007 | Voisin |
| 2007/0096352 A1 | 5/2007 | Cochran |
| 2007/0188023 A1 | 8/2007 | Kraus et al. |
| 2007/0284788 A1 * | 12/2007 | Kurosaki et al. ................ 264/523 |
| 2008/0102148 A1 | 5/2008 | Evrard |
| 2008/0305203 A1 | 12/2008 | Plantamura |
| 2009/0102083 A1 | 4/2009 | Cochran |
| 2009/0214690 A1 | 8/2009 | Feuilloley |
| 2009/0317506 A1 | 12/2009 | Adriansens |
| 2010/0007061 A1 | 1/2010 | Feuilloley et al. |

| | | | |
|---|---|---|---|
| 2010/0072673 | A1 | 3/2010 | Feuilloley et al. |
| 2010/0127435 | A1 | 5/2010 | Feuilloley |
| 2011/0002677 | A1 | 1/2011 | Cochran et al. |

FOREIGN PATENT DOCUMENTS

| | | | |
|---|---|---|---|
| CA | 2 546 517 A1 | 7/2005 | |
| DE | 3518204 C1 | 10/1986 | |
| DE | 3826841 A1 | 2/1990 | |
| DE | 3339613 C2 | 5/1993 | |
| DE | 4234342 A1 | 4/1994 | |
| DE | 196 03 974 A1 | 8/1997 | |
| DE | 197 50 263 A1 | 5/1999 | |
| DE | 101 06 607 A1 | 9/2002 | |
| DE | 101 31 620 A1 | 1/2003 | |
| DE | 101 49 934 A1 | 4/2003 | |
| EP | 0 564 354 A1 | 10/1993 | |
| EP | 0 571 262 A1 | 11/1993 | |
| EP | 0 620 099 A1 | 10/1994 | |
| EP | 0 680 620 A1 | 11/1995 | |
| EP | 0938962 A2 | 9/1999 | |
| EP | 0939358 A1 | 9/1999 | |
| EP | 1 242 229 B1 | 9/2002 | |
| EP | 1 412 684 | 4/2004 | |
| FR | 2 561 986 A1 | 10/1985 | |
| FR | 2 762 799 A1 | 11/1998 | |
| FR | 2 848 906 A1 | 12/2002 | |
| FR | 2 872 734 A1 | 7/2004 | |
| FR | 2876943 A1 | 4/2006 | |
| FR | 2907684 A1 | 5/2008 | |
| FR | 2976514 A1 | 12/2012 | |
| GB | 2095611 A A | 10/1982 | |
| GB | 2165493 A A | 4/1986 | |
| GB | 2230740 A A | 10/1990 | |
| GB | 2324756 A A | 11/1998 | |
| GB | 2399542 A A | 9/2004 | |
| JP | 57-80030 A | 5/1982 | |
| JP | 59-184626 A | 10/1984 | |
| KR | 2007-0097033 | 10/2007 | |
| MX | 2007-006611 A | 7/2007 | |
| WO | 95/14251 A1 | 5/1995 | |
| WO | 98/42050 A1 | 9/1998 | |
| WO | 00/27576 A1 | 5/2000 | |
| WO | 01/39959 A1 | 6/2001 | |
| WO | 01/98870 A2 | 12/2001 | |
| WO | 02/095382 A1 | 11/2002 | |
| WO | 03-002922 A1 | 1/2003 | |
| WO | 2004-009318 A1 | 1/2004 | |
| WO | 2004/030857 A1 | 4/2004 | |
| WO | 2005/065917 A1 | 7/2005 | |
| WO | 2005-067591 A2 | 7/2005 | |
| WO | 2005/068161 A1 | 7/2005 | |
| WO | 2005/123367 A1 | 12/2005 | |
| WO | 2006/010694 A1 | 2/2006 | |
| WO | 2006/045926 A1 | 5/2006 | |
| WO | 2006/056573 A1 | 6/2006 | |
| WO | 2006/056673 A1 | 6/2006 | |
| WO | 2006/060690 A2 | 6/2006 | |
| WO | 2006/069261 A2 | 6/2006 | |
| WO | 2007/149221 A2 | 12/2007 | |
| WO | 2008/154503 A2 | 12/2008 | |

OTHER PUBLICATIONS

Fleischer, A.B., et al., "Procedures for Skin Diseases Performed by Physicians in 1993 and 1994: Analysis of data from the National Ambulatory Medical Care Survey," Journal of the American Academy of Dermatology, Part 1, 37 (5), Nov. 1997, pp. 719-724.
Friedlander, S.F., et al., "Safety of flaticasone propionate cream 0.05% for the treatment of severe and extensive atopic dermatitis in children as young as 3 months," Journal of the American Academy of Dermatology. 46 (3), Mar. 2002, pp. 387-393.
Goings, J. & E. Stephens, "Microchannel cooling ups power capacity for laser-diode bars," Laser Focus World, May 1, 2006.
Gold, M.H. "A Single Center, Open Label Investigator Study of Photodynamic Therapy in the Treatment of Sebaceous Gland Hyperplasia with Topical 20% 5-Aminolevulinic Acid with Visible Blue Light or Intense Pulsed Light," Journal of the American Academy of Dermatology, Abstract P638, Part 2, 50 (3), Mar. 2004, p. P164.
Goyal, A.K., et al., "Wavelength Beam Combining of Mid-IR Semiconductor Lasers," Lasers and Electro-Optics Society, The 14th Annual Meeting of the IEEE, WQ3 2:15pm-2:30pm, pp. 532-533, 2001.
Hanifin, J.M., et al. "Tacrolimus Ointment for the Treatment of Atopic Dermatitis in Adult Patients: Part I, Efficacy." Journal of the American Academy of Dermatology. Jan. 2001, part 2, vol. 44, No. 1, pp. S28-S38.
Hecker, D., et al., "Interactions between tazarotene and ultraviolet light," Journal of the American Academy of Dermatology, 41 (6), pp. 927-930, Dec. 1999.
"Infrared Heat for Glass Processing," Heraeus Noblelight, Aug. 2001.
"Intense Pulsed Light," www.yestheyrefake.net/intense_pulsed_light.htm, Aug. 6, 2003.
Ivey, A., et al., "Medical Issue: Laser Treatement of Rosacea," Google Answers, May 6, 2003.
Janis, M.D., "On Courts Herding Cats: Contending with the "Written Description" Requirement (and Other Unruly Patent Disclosure Doctrines)," Re-Engineering Patent Law, vol. 2:55, pp. 55-108, 2000.
Jeffes, E.W., et al., "Photodynamic therapy of actinic keratoses with topical aminolevulinic acid hydrochloride and fluorescent blue light," Journal of the American Academy of Dermatology, Abstract, Part 1, 45 (1), Jul. 2001.
"Lasers Offer New Medical and Cosmetic Treatment Options for Patients with Skin of Color," American Academy of Dermatology—Public Resources, Press Release, Jul. 27, 2003, Chicago, IL.
Lebwohl, M., et al., "Interactions between calcipotriene and ultraviolet light." Journal of the American Academy of Dermatology, 37 (1), pp. 93-95, Jul. 1997.
"Low Energy Photon (LEPT)—Light Emitting Diode (LED)—Light Therapy," Allied Light Therapy, www.alliedlighttherapy.com/page1.html., Mar. 3, 2004.
Mallozzi, J., "Thin-Disk Lasers Position Themselves in Industry," R&D Magazine, pp. 21-23, Apr. 2005.
"MID-IR LEDS—1.6 µm . . . 5.0 µm" www.roithner-laser.com/LED_MID_IR.htm., Aug. 4, 2004.
Morton, C.A., et al., "The Efficacy of Violet Light in the Treatment of Acne," Journal of the American Academy of Dermatology, Abstract P59, Part 2, 50 (3), p. P15, Mar. 2004.
Nagasaka, K., et al., "Micro-bonding laser chips using arrayed beams," SPIE Newsroom, Micro/Nano Lithography & Fabrication, Jul. 24, 2008.
Nestor, M.S., "Combination Phototherapy and Adapalene in the Treatment of Acne Vulgaris," Journal of the American Academy of Dermatology, Abstract P664, Part 2, 50 (3), p. P170, Mar. 2004.
Paller, A., et al., "A 12-Week Study of Tacrolimus Ointment for the Treatment of Atopic Dermatitis in Pediatric Patients," Journal of the American Academy of Dermatology, 44 (1), pp. S47-S57, Jan. 2001.
PerkinElmer, "Superior Chip-on-Board Technology for the most demanding LED applications," www.optoelectronics.perkinelmer.com, 2006.
Rattunde, M., et al., "Power efficiency of GaSb based 2.0µm diode Lasers," Lasers and Electro-Optics Society, The 14th Annual Meeting of the IEEE, WQ2 2:00pm-2:15pm, pp. 530-531, 2001.
"Rosacea: Pulse-Light Treatments Get the Red Out," UT-Houston—Health Leader, www.uthouston.edu/hLeader/archive/skinhealth/010927/index.html., Mar. 3, 2004.
"Skin Contact Monochromatic Infrared Energy: Technique to Treat Cutaneous Ulcers, Diabetic Neuropathy and Miscellaneous Musculoskeletal Conditions," Blue Cross of California, Medical Policy 2.01.22, Jun. 25, 2003.
Soter, N.A., et al., "Tacrolimus ointment for the treatment of atopic dermatitis in adult patients: Part II, Safety," Journal of the American Academy of Dermatology, 44 (1), pp. S39-S46, Jan. 2001.
Tanzi, E.L., et al., "Lasers in dermatology: Four decades of progress," Journal of the American Academy of Dermatology, Abstract, Part 1, 49 (1), Jul. 2003.
Thomson Hybrides, "Saut Technologique Pour Une Nouvelle Structure de Diodes Laser de Puissance," Du Cote de la Rue Descartes, pp. 12-13. (Date not available).

Wagner, J. "Diode Lasers for High-Power Applications at 2 pm," Fraunhofer IAF, Achievement and Results, pp. 24-25, 2001.

Wiese, A., "Potential Savings for Preform Heating by Using NIR Technology," PETnology Europe 2007 Conference Presentation, Mar. 26, 2007.

Wolfe, W.L. & G.J. Zissis, Eds., "The Infrared Handbook: revised edition" Environmental Research Institute of Michigan, pp. 5-56-5-57, 1989.

Woodcock, J., Letter to M. Macdonald, D.A. Jaskot and J.F. Hurst re ANDA from Department of Health & Human Services, Center for Drug Evaluation and Research, Jun. 11, 2002.

Zanolli, M., "Phototherapy treatment of psoriasis today," Journal of the American Academy of Dermatology, Abstract, Part 2, 49 (2), Aug. 2003.

* cited by examiner

HEATING PLASTICS VIA INFRARED RADIATION

CROSS REFERENCE TO RELATED APPLICATIONS

This application is a National Stage of International Application No. PCT/FR2008/000145 filed Feb. 7, 2008, claiming priority based on French Patent Application No. 0701533 filed Mar. 2, 2007, the contents of all of which are incorporated herein by reference in their entirety.

The invention relates to the heating of plastics, and more particularly of thermoplastics.

The heating of thermoplastics is used in numerous fields. One preponderant use in industry is the moulding of parts. There are however several moulding techniques, which require different types of heating.

In certain moulding techniques, the thermoplastics are heated at a temperature above their melting point in order to be rendered fluid and shaped from their fluid form. Mention may be made, by way of examples, of extrusion, injection moulding or else rotational moulding (rotomoulding).

In other techniques, the thermoplastics are heated at a temperature above their glass transition temperature, but below their melting point so as to render the material ductile and allow it to be shaped. Mention may be made, by way of example, of thermoforming or else blowmoulding, or more specifically injection-blowmoulding or injection-blowmoulding with biaxial orientation. In these techniques, the heating of the material is gentler than in the other techniques mentioned above, as it is essential to accurately control the heating. This heating is generally carried out by radiation in an oven, the objects heated not being in contact with the heating elements.

In an industrial context, it goes without saying that the heating time is an important parameter since the rates of output imposed by the production are generally very high. This is why it appears desirable to reduce the heating time as much as possible, without however neglecting the other parameters, especially the uniformity of heating, the penetration of the radiation inside the material and the energy efficiency.

It is known that in the entire spectrum only the infrared radiation is truly useful for heating.

In industry, and more particularly in the manufacture of containers from blanks (preforms or intermediate containers) made of thermoplastic, use is made of ovens equipped with halogen lamps which, although they have the advantage of being powerful, have however the drawback of radiating over the entire spectrum, so that part of the power consumed is radiated as pure loss, the overall efficiency of the ovens therefore being relatively low.

In order to improve the efficiency of the ovens while seeking to reduce the heating time, the Applicant has recently proposed, in international Application WO 2006/056673, to use a coherent and more particularly monochromatic electromagnetic beam, especially a laser which may be emitted from a laser diode, in order to carry out the heating of preforms.

This technique is promising and is worth improving, since the inventors have observed that the heating thus carried out does not make it possible to obtain constant performances according to the material chosen.

One object of the invention is therefore to provide a solution that makes it possible to improve the versatility of the heating so that, for a range of different materials, a compromise can be made between the heating time, the uniformity of heating and the energy efficiency.

For this purpose, the invention provides a process for heating a plastic by means of at least one source of electromagnetic radiation, for which the radiation is emitted in the infrared at a wavelength or in a wavelength spectrum contained in one of the following ranges:
1110-1160 nm;
1390-1450 nm;
1610-1650 nm;
1675-1700 nm;
1880-2100 nm;
2170-2230 nm,
and preferably in one of the following ranges:
1110-1150 nm;
1400-1430 nm;
1627-1647 nm;
1680-1695 nm;
1890-1906 nm;
1920-1950 nm;
2074-2094 nm;
2188-2216 nm.

According to preferred embodiments, the value of the wavelength of the infrared radiation may be substantially equal to one of the following values:
1130 nm,
1414 nm,
1637 nm,
1688 nm,
1898 nm,
1935 nm,
2084 nm,
2205 nm.

Moreover, according to one particular embodiment, several radiations may be emitted at different wavelengths or over different spectra, each contained in one of the above ranges or having one of the values listed above.

The electromagnetic radiation is preferably monochromatic or quasi-monochromatic. As regards the source of electromagnetic radiation, it is, for example, a laser.

This process may especially be applied:
to heating blanks for manufacturing containers from said blanks; or else
to heating foils or sheets for manufacturing objects by thermoforming.

Other subjects and advantages of the invention will appear in light of the following description of embodiments.

The process proposed aims to heat an intermediate object made from a thermoplastic with a view to its subsequent deformation in order to obtain a finished article. The intermediate object may be a thin sheet intended to be thermoformed, especially for obtaining an object such as a wide-necked container (for example, a box) or else a preform intended to be blowmoulded or stretch-blowmoulded in order to obtain a narrow-necked container (such as a bottle).

Among the materials envisaged, mention is especially made of polyethylene terephthalate (PET), polypropylene (PP) and polylactic acid (PLA), the main thermal characteristics of which are given in Table 1 below. It should be noted that these materials are widely used in the manufacture of containers.

|  | PET | PP | PLA |
| --- | --- | --- | --- |
| Melting point (° C.) | 250 to 270 | 162 to 168 | 173 to 178 |
| Glass transition temperature (° C.) | 75 to 80 | −10 to +10 | 50 to 80 |

The inventors started from the observation that at constant radiated spectrum and constant power, the heating did not generally produce the same results according to the materials chosen, the heating rates varying from one material to another. In particular, large differences were observed between PET on the one hand and PP on the other hand.

Tests were carried out on several materials in order to choose, over the entire spectrum, wavelengths which may be suitable for heating carried out industrially on all of these materials while keeping one and the same source of electromagnetic radiation.

The test conditions were the following.

The samples studied were thin sheets having a thickness of 3 mm produced from the following materials:

PET EASTMAN 9921,
PET DAK Laser+,
PLA NATUREWORKS 7000D,
PP NOVOLEN 3348,
Mixture PET/Nylon 2%.

The samples were subjected, unilaterally (that is to say on one of the faces, known as the incident face), to an incident infrared radiation, the power of which was 2 W/cm$^2$, for a selection of wavelengths between 800 nm and 2500 nm.

For each sample and at each wavelength chosen the following were measured:

the radiation absorption efficiency $\rho$, that is to say the ratio of the power absorbed by the sample to the incident power;

the heating rate V1 of the material on the incident face (i.e. to a depth of around 100 μm); and the heating rate V2 of the material on the opposite face (i.e. also to a depth of around 100 μm).

The measurements are collated, for each sample, in Tables 2.1 to 2.5 below.

TABLE 2.1

| PET Eastman 9921 | | | |
|---|---|---|---|
| λ | ρ (%) | V1 (° C./s) | V2 (° C./s) |
| 880* | 2 | 0.1 | 0.1 |
| 1130 | 17 | 0.7 | 0.6 |
| 1414 | 23 | 1 | 0.8 |
| 1637 | 39 | 1.9 | 1.2 |
| 1662* | 89 | 9.4 | 0.7 |
| 1688 | 62 | 3.8 | 1.4 |
| 1736* | 55 | 3.2 | 1.4 |
| 1898 | 58 | 3.5 | 1.4 |
| 1935 | 46 | 2.4 | 1.3 |
| 2084 | 59 | 3.5 | 1.4 |
| 2136* | 89 | 9.2 | 0.7 |
| 2205 | 69 | 4.7 | 1.4 |

TABLE 2.2

| PET DAK Laser+ | | | |
|---|---|---|---|
| λ | ρ (%) | V1 (° C./s) | V2 (° C./s) |
| 880* | 9 | 0.4 | 0.3 |
| 1130 | 23 | 1 | 0.8 |
| 1414 | 29 | 1.4 | 1 |
| 1637 | 45 | 2.4 | 1.3 |
| 1662* | 90 | 9.7 | 0.7 |
| 1688 | 66 | 4.2 | 1.4 |
| 1736* | 59 | 3.5 | 1.4 |
| 1898 | 62 | 3.9 | 1.4 |
| 1935 | 51 | 2.9 | 1.4 |
| 2084 | 64 | 4 | 1.4 |
| 2136* | 90 | 9.7 | 0.7 |
| 2205 | 73 | 5.2 | 1.3 |

TABLE 2.3

| PLA 7000D | | | |
|---|---|---|---|
| λ | ρ (%) | V1 (° C./s) | V2 (° C./s) |
| 880* | 8 | 0.3 | 0.3 |
| 1130 | 10 | 0.4 | 0.4 |
| 1414 | 24 | 1.1 | 0.8 |
| 1637 | 14 | 0.6 | 0.5 |
| 1662* | 47 | 2.5 | 1.3 |
| 1688 | 67 | 4.4 | 1.4 |
| 1736* | 68 | 4.5 | 1.4 |
| 1898 | 63 | 4 | 1.4 |
| 1935 | 44 | 2.3 | 1.3 |
| 2084 | 53 | 2.9 | 1.4 |
| 2136* | 66 | 4.2 | 1.4 |
| 2205 | 65 | 4.1 | 1.4 |

TABLE 2.4

| PP NOVOLEN 3348 | | | |
|---|---|---|---|
| λ | ρ (%) | V1 (° C./s) | V2 (° C./s) |
| 880* | 46 | 2.5 | 1.2 |
| 1130 | 38 | 1.9 | 1.1 |
| 1414 | 50 | 2.8 | 1.3 |
| 1637 | 37 | 1.8 | 1.1 |
| 1662* | 38 | 1.9 | 1.1 |
| 1688 | 67 | 4.4 | 1.4 |
| 1736* | 90 | 9.7 | 0.7 |
| 1898 | 62 | 3.8 | 1.4 |
| 1935 | 60 | 3.6 | 1.4 |
| 2084 | 54 | 3 | 1.4 |
| 2136* | 53 | 3 | 1.4 |
| 2205 | 66 | 4.2 | 1.4 |

TABLE 2.5

| PET Nylon 2% | | | |
|---|---|---|---|
| λ | ρ (%) | V1 (° C./s) | V2 (° C./s) |
| 880* | 21 | 0.9 | 0.7 |
| 1130 | 31 | 1.4 | 1 |
| 1414 | 33 | 1.6 | 1.1 |
| 1637 | 46 | 2.4 | 1.3 |
| 1662* | 86 | 7.9 | 1 |
| 1688 | 66 | 4.2 | 1.4 |
| 1736* | 61 | 3.7 | 1.4 |
| 1898 | 59 | 3.5 | 1.4 |
| 1935 | 52 | 2.9 | 1.4 |
| 2084 | 65 | 4.1 | 1.4 |
| 2136* | 85 | 7.5 | 1 |
| 2205 | 74 | 5.2 | 1.4 |

It was observed that, for a certain number of wavelengths, a good compromise was achieved between the efficiency (sufficiently high) and the V1/V2 thermal gradient (sufficiently low), which attests to a relatively uniform and versatile heating.

A contrario, for other wavelengths, marked by an asterisk in the above tables, it was observed for at least one of the materials chosen that this compromise was not achieved.

At 880 nm for example, the efficiency was too low for the PET EASTMAN 9921.

At 1662 nm, the thermal gradient was too high for the PET DAK Laser+ and for the PET Nylon.

At 1736 nm, the thermal gradient was too high for the PP NOVOLEN 3348.

At 2136 nm, the thermal gradient was too high for all the PETs including for the PET Nylon.

This analysis led to choosing, for the electromagnetic radiation from the source used for heating the thermoplastics, the following wavelengths (in nm): 1130, 1414, 1637, 1688, 1898, 1935, 2084 and 2205.

It can be envisaged to combine these wavelengths, for example by juxtaposing several sources having different values each chosen from the wavelengths listed above.

In practice, the electromagnetic radiation emitted by the commercial sources of infrared radiation is not concentrated over a single wavelength, but extends over a more or less broad spectrum (from a few nm to several tens of nm).

Thus, although it is possible, via various assemblies (such as the interposition of an interference filter in front of a halogen lamp), to restrict the spectrum of the radiation emitted in order to obtain a radiation at a single wavelength (monochromatic) or with a tolerance of a few nanometers (quasi-monochromatic), it is more reasonable to choose a less expensive source (such as a powerful laser diode) for which the spectrum emitted will cover the chosen wavelength, without however extending to one (or several) undesirable wavelength(s).

Provided below, opposite the chosen wavelengths, are the admissible tolerances, that is to say the ranges of wavelengths within which the wavelength or the spectrum emitted by the chosen source may lie.

Table 3.1 provides a first series of relatively tight tolerances. Table 3.2 provides a second series of broader tolerances. It is considered that outside of these tolerances, the radiation emitted does not make it possible to achieve the objectives formulated above.

TABLE 3.1

| Wavelengths (nm) | Tolerances (nm) |
| --- | --- |
| 1130 | 1110-1150 |
| 1414 | 1400-1430 |
| 1637 | 1627-1647 |
| 1688 | 1680-1695 |
| 1898 | 1890-1906 |
| 1935 | 1920-1950 |
| 2084 | 2074-2094 |
| 2205 | 2188-2216 |

TABLE 3.2

| Wavelengths (nm) | Tolerances (nm) |
| --- | --- |
| 1130 | 1110-1160 |
| 1414 | 1390-1450 |
| 1637 | 1610-1650 |
| 1688 | 1675-1700 |
| 1898, 1935, 2084 | 1880-2100 |
| 2205 | 2170-2230 |

As is indicated above, it may be advantageous to combine several wavelengths or several spectra, for example by juxtaposing several sources that each emit (monochromatically, quasi-monochromatically or over a spectrum) in one of the ranges chosen.

As is suggested above, the process of heating a thermoplastic consisting in irradiating the material using an electromagnetic radiation emitted in the infrared in one of the wavelengths chosen, or in a spectrum contained in one of the ranges chosen, may be successfully applied to the heating of blanks (which are preforms or even intermediate containers) for manufacturing containers.

This process may also be applied to the heating of sheets or foils for manufacturing objects by thermoforming.

The invention claimed is:

1. Process for heating a plastic by means of at least one source of electromagnetic radiation, characterized in that the electromagnetic radiation is emitted in the infrared at a wavelength or in a wavelength spectrum contained in one of the following ranges:

1110-1160 nm;
1390-1450 nm;
1610-1650 nm;
1675-1700 nm;
1880-2100 nm;
2170-2230 nm; in which several radiations are emitted at different wavelengths or over different spectra, each contained in one of said ranges or having one of said values.

2. Process according to claim 1, in which the wavelength or the spectrum of the infrared radiation is contained in one of the following ranges:

1110-1150 nm;
1400-1430 nm;
1627-1647 nm;
1680-1695 nm;
1890-1906 nm;
1920-1950 nm;
2074-2094 nm;
2188-2216 nm.

3. Process according to claim 1, in which the wavelength of the infrared radiation is around 1130 nm.

4. Process according to claim 1, in which the wavelength of the infrared radiation is around 1414 nm.

5. Process according to claim 1, in which the wavelength of the infrared radiation is around 1637 nm.

6. Process according to claim 1, in which the wavelength of the infrared radiation is around 1688 nm.

7. Process according to claim 1, in which the wavelength of the infrared radiation is around 1898 nm.

8. Process according to claim 1, in which the wavelength of the infrared radiation is around 1935 nm.

9. Process according to claim 1, in which the wavelength of the infrared radiation is around 2084 nm.

10. Process according to claim 1, in which the wavelength of the infrared radiation is around 2205 nm.

11. Process according to claim 1, in which the electromagnetic radiation is monochromatic or quasi-monochromatic.

12. Process according to claim 11, in which the source of electromagnetic radiation is a laser.

13. Application of the process according to claim 1 to heating blanks for manufacturing containers from said blanks.

14. Application of the process according to claim 1 to heating foils or sheets for manufacturing objects by thermoforming.

15. The process for heating the plastic according to claim 1, wherein the electromagnetic radiation is emitted in the infrared in the wavelength spectrum contained in one of the following ranges:

1110-1160 nm;
1390-1450 nm;
1610-1650 nm;
1675-1700 nm;
1880-2100 nm;
2170-2230 nm.

* * * * *